United States Patent
Menelly

[15] 3,676,729
[45] July 11, 1972

[54] ARC DISCHARGE LAMP HAVING A THIN CONTINUOUS FILM OF INDIUM OXIDE ON THE INNER SURFACE THEREOF

[72] Inventor: Richard A. Menelly, Danvers, Mass.
[73] Assignee: Sylvania Electric Products Inc.
[22] Filed: June 23, 1969
[21] Appl. No.: 835,753

[52] U.S. Cl ............................. 313/109, 117/33.3, 313/112, 313/221
[51] Int. Cl ........................................................ H01j 61/35
[58] Field of Search ................. 313/109, 174, 178, 221, 110, 313/112; 350/1; 117/33.3

[56] References Cited

UNITED STATES PATENTS

| | | | |
|---|---|---|---|
| 2,774,903 | 12/1956 | Burns | 313/112 X |
| 3,185,020 | 5/1965 | Thelen | 117/33.3 |
| 3,400,288 | 9/1968 | Groth | 350/1 X |
| 3,339,100 | 8/1967 | Menelly | 313/109 |

*Primary Examiner*—Roy Lake
*Assistant Examiner*—Palmer C. Demeo
*Attorney*—Norman J. O'Malley and James Theodosopoulos

[57] ABSTRACT

An arc discharge lamp has a clear glass envelope on the inner surface of which is disposed a thin, continuous film of indium oxide. The film transmits visible light but absorbs ultraviolet radiation. A phosphor coating may be disposed on the indium oxide film.

In order to form the film, a solution of an indium salt of a preselected organic acid is applied to the glass, dried under controlled conditions and heated to a predetermined temperature to convert the indium salt to indium oxide.

1 Claim, No Drawings

ARC DISCHARGE LAMP HAVING A THIN CONTINUOUS FILM OF INDIUM OXIDE ON THE INNER SURFACE THEREOF

BACKGROUND OF THE INVENTION

1. Field of the Invention

This invention relates generally to the field of arc discharge lamps and more particularly to those lamps the arcs of which produce significant amounts of radiation in the ultraviolet region of the spectrum.

2. Description of the Prior Art

In an ordinary fluorescent lamp, a particulate phosphor coating is disposed on the inner surface of a glass envelope. The arc of such a lamp produces significant amounts of ultraviolet radiation, some of which penetrates the voids in the particulate phosphor coating and impinges on the glass, causing a phenomenon therein known as solarization. Although the solarization reaction is not completely understood, it apparently causes a chemical change in the glass which results in the formation of color centers within the glass structure. These color centers are light absorbing and consequently reduce the light transmittance of the glass. Over an extended period of lamp operation, solarization can cause a substantial reduction in the light output of an ordinary fluorescent lamp.

SUMMARY OF THE INVENTION

An arc discharge lamp made in accordance with this invention has a light transmitting glass envelope on the inner surface of which is disposed a thin, continuous, ultraviolet absorbing film of indium oxide. The film is continuous, and not particulate, in the sense that it is originally deposited on the glass by the wetting thereof with a solution of indium salt, evaporating the liquid from the wet film adhering to the glass and subsequently oxidizing the resultant continuous film of indium salt to indium oxide.

The indium salt solution used to lay down the initial wet film on the glass envelope must be of a type that will maintain film continuity after the solvent has been evaporated therefrom and after any organic binder has been burned off, in contradistinction to a film that segregates into minute particles either upon deposition or after solvent removal or binder removal. I have found that the indium salts of cylic, aliphatic or aromatic organic acids may be suitable for deposition of a continuous film, especially those organic acids having 6 or more carbon atoms in a molecule of the acid. Examples of cylic, aliphatic and aromatic acids that may be used are naphthenic, methylhexanoic and benzoic, respectively.

In applying the film, the indium salt is first dissolved in a suitable non-aqueous solvent, such as ethyl alcohol or an aromatic solvent, to a predetermined concentration. Thickness of the ultimate indium oxide film is directly dependent on the concentration of indium salt in the solution.

I have found that an organic film-forming binder must be incorporated into the indium salt solution in order to obtain the desired continuous film of indium oxide. A suitable binder must be miscible with the solution and may be a plastic such as ethyl cellulose or nitro cellulose. The inside of the glass lamp envelope is completely wet with the binder-indium salt solution and the excess solution is then poured off, leaving a wet film which is then carefully dried to avoid moisture condensation thereon. Subsequently, the envelope is heated to an elevated temperature so that the organic binder is completely burned off, that is, eliminated from the film, and the indium salt is converted to indium oxide.

The continuity of the indium oxide film can be determined by measuring its electrical resistivity. Generally, when a continuous film has been obtained, it will appreciably reduce the surface resistivity of a glass envelope, even when the film thickness is only in the order of several Angstroms thick. A discontinuous or particulate coating, in contrast, will result in a similar reduction of resistivity only when there are a sufficient number of particles contacting each other to simulate continuity. The thickness of such a particulate film is hundreds of times thicker than the continuous film; as a result, its light transmittance is undesirably lower than that of the continuous film of the instant invention.

DESCRIPTION OF THE PREFERRED EMBODIMENT

A solution for preparing a continuous indium oxide film on a lamp envelope in accordance with this invention consisted of one milliliter of indium napthenate solution in 199 milliliters of a liquid vehicle. The liquid vehicle consisted of 2 weight percent of ethyl cellulose binder dissolved in 98 weight percent of xylene.

The solution was poured into and through an open ended fluorescent lamp glass envelope, while the envelope was being rotated to insure that the entire inside surface thereof was wet by the solution. After the excess solution was drained from the envelope, the wet film was slowly dried in an environment having a temperature of 77° F and a relative humidity of 50 percent. If a wet film is dried too rapidly, localized film cooling may occur which may result in moisture condensation thereon. Such condensation can react with the film to yield an organic product that will not subsequently burn off completely, but will yield an undesirable carbonaceous residue.

The dried film was then heated in air at 600° C. for three minutes to completely burn off the organic matter and to convert the indium naphthenate to indium oxide. The thickness of the indium oxide film was calculated to be about 27 Angstroms, the calculation being based on the weight pickup of a flat glass slide that was coated with the above solution.

Two groups, A and B, of 48 inch fluorescent lamp envelopes were coated with a continuous indium oxide film, as described above, and were manufactured into fluorescent lamps for comparison with conventionally made fluorescent lamps. The lamps of group A did not have a phosphor coating thereon in order to permit evaluation of the film on a clear glass envelope having no phosphor. The lamps of group B had a conventional calcium halophosphate phosphor deposited directly on the indium oxide film.

The lamps of group A were tested and compared with a control, consisting of conventional fluorescent lamps which, also, had no phosphor coating. The lamps were operated at normal operating voltage for 1,000 hours, and the light transmission of the clear glass envelopes was measured periodically. Group A lamps had an initial, as well as final, light transmission of 84 percent, the transmission thus remaining constant throughout the period of lamp operation.

However, the light transmission of the control lamps decreased steadily throughout operation, the transmission being 86 percent initially, 80 percent after 500 hours and 77 percent after 1,000 hours of operation.

The results of the test indicate that the indium oxide film prevented the arc radiation from causing a reaction in the glass and thereby maintained a high transmission of light through the glass envelope during lamp operation.

Group B lamps, having the above mentioned indium oxide and phosphor coatings thereon, were compared with conventional fluorescent lamps having the same phosphor. The lamps were operated at normal voltage for 500 hours. After 100 hours of operation, the light output of the group B lamps was 98 percent of initial light output; while that of the conventional lamps was only 96 percent. After 500 hours of operation, the respective figures were 96 percent and 95 percent.

In utilizing the continuous film of this invention in fluorescent lamps, it is preferable that the film thickness and resistivity be such as to not adversely affect the lamp starting voltage. That is to say, the starting voltage of the indium oxide coated lamp should generally be within the voltage output capability of the normally used lamp ballasts. In the 48 inch lamps tested above, the resistivity of the clean envelope, without an indium oxide film, is about $10^{12}$ ohms. A continuous indium oxide film on the inner surface of the glass deposited from a one-half percent, one percent and 2 percent indium naphthenate solution lowers the envelope resistivity to about $10^{10}$, $10^9$ and $10^8$ ohms, respectively. A resistivity lower than about $10^8$ ohms, for this particular 48 inch fluorescent lamp, may raise the starting voltage excessively.

As mentioned before, the film thickness is directly related to the concentration of indium naphthenate in the ethyl cellulose coating solution and is about 50 to 55 Angstroms for each one percent of indium naphthenate therein. Thus, the film thickness for the 2 percent solution which resulted in an envelope resistivity of $10^8$ ohms was about 100–110 Angstroms. The coating thickness per percent of indium salt will differ when other indium salts, such as indium octoate or indium hexanate, are used and when other binders, such as nitrocellulose, are used.

I claim:

1. In an arc discharge lamp having a glass envelope and arc generating means within the envelope, the improvement which comprises a thin, continuous, ultraviolet-absorbing film of indium oxide on the inner surface of the glass envelope, said film being transparent to visible radiation and having a thickness less than about 100 Angstroms, and a layer of phosphor coating on the indium oxide film.

* * * * *